United States Patent [19]

Nakai et al.

[11] Patent Number: 5,686,895
[45] Date of Patent: Nov. 11, 1997

[54] DISPLAY UNIT FOR AUTOMOBILES

[75] Inventors: Tomoaki Nakai; Makoto Kondo; Morio Kayano, all of Wako, Japan

[73] Assignee: Honda Giken Kogyo Kabushiki Kaisha, Tokyo, Japan

[21] Appl. No.: 478,963

[22] Filed: Jun. 7, 1995

[30] Foreign Application Priority Data

Oct. 21, 1994 [JP] Japan ..................... 6-257000

[51] Int. Cl.⁶ ................................................ G08B 21/00
[52] U.S. Cl. .............. 340/636; 320/48; 340/439; 340/450.2
[58] Field of Search ..................... 340/438, 439, 340/425.5, 457, 459, 461, 450.2, 636, 988, 990, 995; 364/442; 324/435, 425; 320/48; 180/65.1; 235/384

[56] References Cited

U.S. PATENT DOCUMENTS

| | | | |
|---|---|---|---|
| 4,210,908 | 7/1980 | Sakakibara | 340/439 |
| 4,623,870 | 11/1986 | Irimajiri et al. | 340/439 |
| 4,636,782 | 1/1987 | Nakamura et al. | 340/461 |
| 4,663,718 | 5/1987 | Augello et al. | 364/442 |
| 5,006,829 | 4/1991 | Miyamoto et al. | 340/459 |
| 5,313,191 | 5/1994 | Yamashita et al. | 180/65.1 |
| 5,459,666 | 10/1995 | Casper et al. | 364/442 |
| 5,534,759 | 7/1996 | Evans et al. | 180/65.1 |
| 5,539,399 | 7/1996 | Takahira et al. | 340/636 |

FOREIGN PATENT DOCUMENTS

6189402  7/1994  Japan.

*Primary Examiner*—Brent A. Swarthout
*Attorney, Agent, or Firm*—Lyon & Lyon LLP

[57] ABSTRACT

A display unit for an automobile includes a graph comprising a vertical axis X and a horizontal axis Y. The vertical axis X indicates a remaining capacity of driving energy, such the capacity of batteries in an electric vehicle, and the horizontal axis Y indicates a remaining distance that can be traveled based on the remaining capacity of driving energy. Thus, the remaining capacity and the remaining distance are integrally displayed on a single graph.

8 Claims, 6 Drawing Sheets

DISPLAY UNIT FOR AUTOMOBILES

BACKGROUND OF THE INVENTION

1. Field of the Invention

The present invention relates to a display unit for automobiles for displaying a remaining amount of driving energy (hereinafter referred to as "remaining energy") and an available remaining traveling distance (hereinafter referred to as "remaining distance") of an automobile.

2. Description of the Related Art

In recent years, electric automobiles driven by electric motors have been developed as well as engine automobiles driven by internal combustion engines, and hybrid automobiles which also use engines together with electric motors.

Any automobile of any of the types described above has means for displaying a remaining amount (remaining capacity) of fuel such as gasoline, light oil and LPG or batteries as driving energy. However, it has been further demanded to know a remaining distance in km or Miles allowed by the use of the remaining energy.

Figure 9:
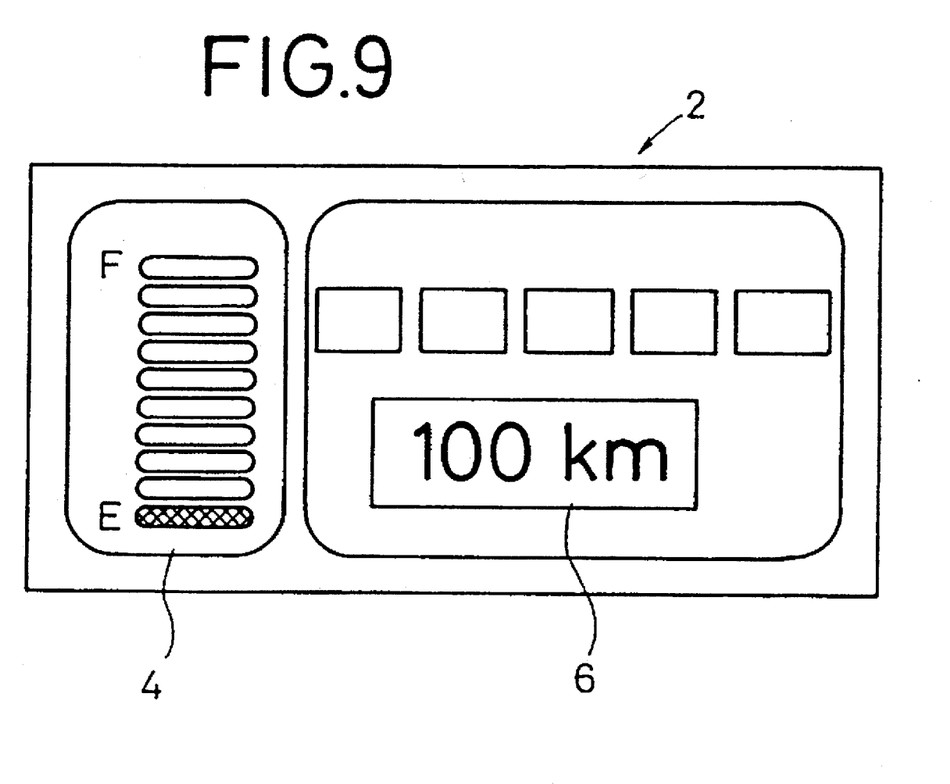
FIG. 9 is an explanatory view of a conventional display unit.

Thus, for example, a display unit shown in FIG. 9 is known (see FIG. 3 in Japanese Laid-open Patent Publication No. 6-189402). The display unit 2 is installed in an electric automobile, and comprises a remaining energy display portion 4 for batteries, and a remaining distance display portion 6. The remaining energy display portion 4 displays the remaining energy of the batteries by using a bar graph. The remaining distance display portion 6 digitally displays the remaining distance by using numerals.

However, in the conventional display unit described above, the remaining energy of the batteries is displayed using the bar graph, while the remaining distance is displayed with the numerals. For this reason, there has been a problem that a driver cannot easily recognize a relationship between the remaining capacity of the batteries and the remaining distance although the remaining capacity of the batteries is closely related to the remaining distance.

SUMMARY OF THE INVENTION

The present invention has been made to solve the above problem. Therefore, an object of the invention is to provide a display unit for an automobile capable of making a display so that the relationship between the remaining amount of driving energy and the remaining distance can be easily recognized.

In order to achieve the above object, the present invention provides a display unit for displaying a remaining amount of driving energy and a remaining distance of an automobile, including a graph type display means comprising vertical and horizontal axes, wherein the vertical axis is a display portion for the remaining amount of the driving energy, and the horizontal axis is the remaining distance display portion in relation to the remaining amount of the driving energy.

In the display unit according to the present invention, the remaining amount display portion for the driving energy is provided along the vertical axis, and the remaining distance display portion is provided along the horizontal axis. Thus, the remaining amount of energy and the remaining distance are displayed in one graph. Accordingly, a driver can easily recognize the relationship between the remaining amount of energy and the remaining distance at a glance only by seeing the single graph.

DESCRIPTION OF THE PREFERRED EMBODIMENT

Figure 1:
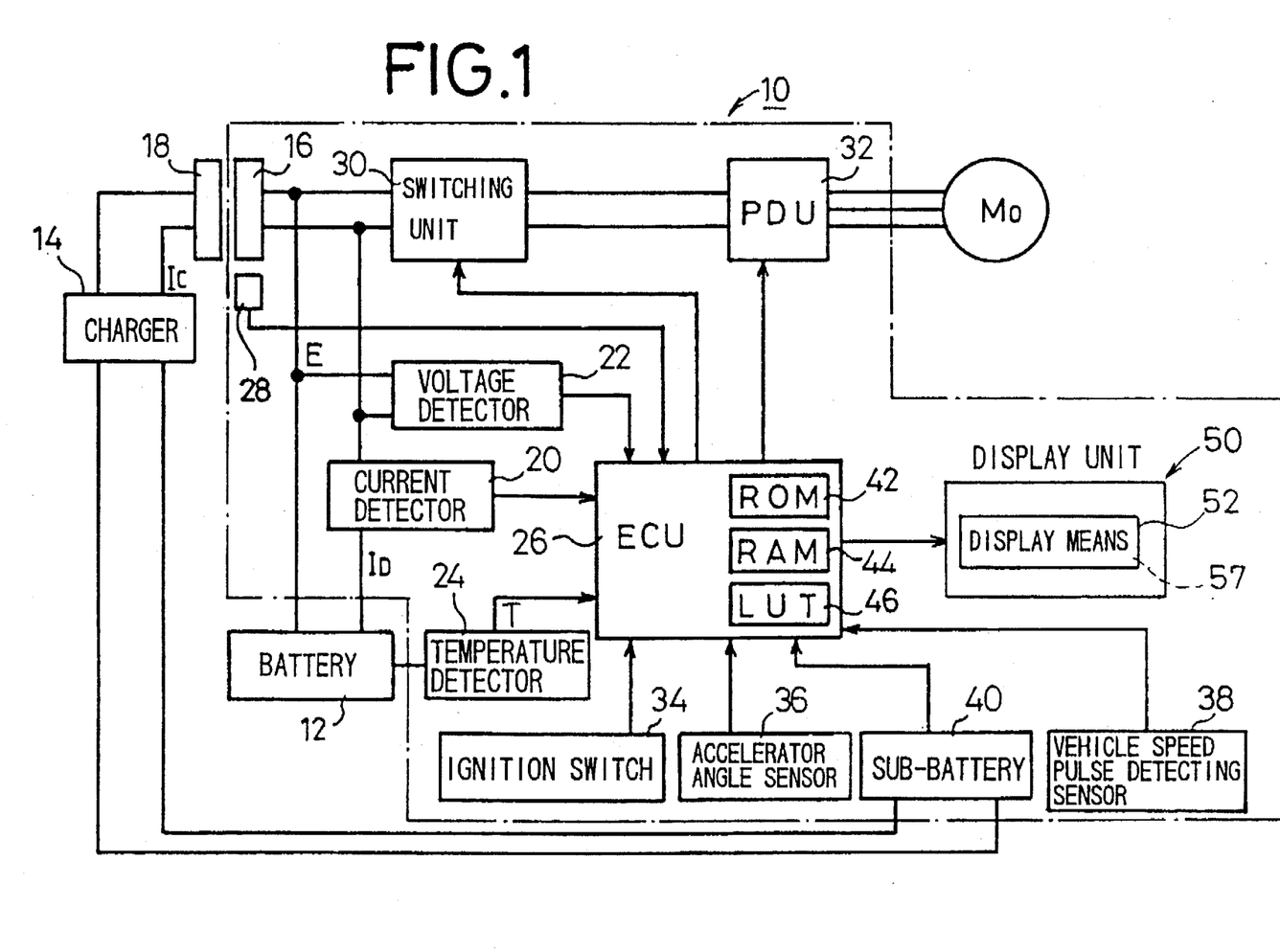
FIG. 1 is a block diagram showing an electrical circuit of an electric automobile in which a display unit for automobiles according to the present invention is incorporated.

FIG. 1 is a block diagram showing a major electrical circuit 10 of an electric automobile in which a display unit according to an embodiment of the present invention is incorporated.

The electrical circuit 10 includes a plurality of batteries 12 connected in series, and a motor $M_o$ driven by the batteries 12. A charger 14 can be connected to the batteries 12 at a desired time through engagement between a connector on charged side 16 and a connector on charging side 18 which is connected to the charger 14.

The electrical circuit 10 has a current detector 20 for detecting a discharge current $I_D$ supplied to the motor $M_o$ and other electrical equipment (not shown) and a charge current $I_c$ supplied from the charger 14, a voltage detector 22 for detecting a voltage between the terminals of the batteries 12 (hereinafter referred to as "battery voltage") E, and a temperature detector 24 for detecting a temperature of the batteries 12. It further includes an electronic control unit (hereinafter referred to as "ECU") 26 for calculating a remaining capacity C or remaining energy of the batteries 12 on the basis of the detected data outputted from the current detector 20, the voltage detector 22 and the temperature detector 24, and also for calculating a remaining distance ZS in relation to the remaining capacity C.

ECU 26 is connected to a connection detecting sensor 28 for detecting whether or not the connector on charging side 18 of the charger 14 is engaged with the connector on charged side 16, a switching unit 30 provided between the batteries 12 and the motor $M_o$, a power drive unit (hereinafter referred to as "PDU") 32 for driving the motor $M_o$, an ignition switch 34, an accelerator sensor 36 for detecting a pedal angle of an accelerator, and a vehicle speed pulse detecting sensor 38 for detecting a running distance.

ECU 26 is driven by a power source supplied from a sub-battery 40. It includes a read-only memory (hereinafter referred to as "ROM") 42 for storing a program for calculating the remaining capacity C of the batteries 12, a running distance ΔS per unit time (t), for example, per one minute (hereinafter explanation will be made by using one minute in the same manner), a ratio (hereinafter referred to as "electric power consumption") D of the running distance ΔS per one minute to a discharge amount ΔC per one minute, and a remaining distance ZS; a random-access memory (hereinafter referred to as "RAM") 44 for temporarily storing calculation results when ECU 26 performs various calculations; and a look-up table (hereinafter referred to as "LUT") 46 for providing stored information for use when ECU 26 performs various calculations.

Figure 2:
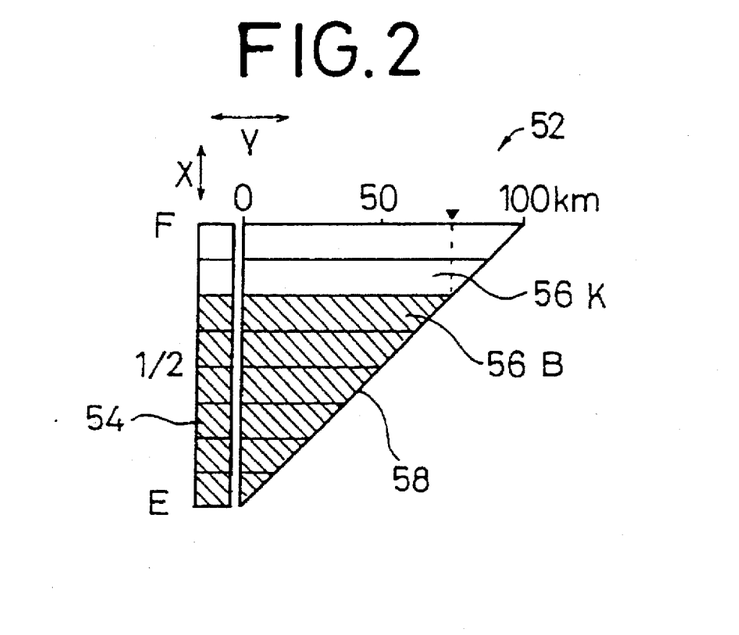
FIG. 2 is an explanatory front view of a display unit in accordance with a first embodiment of the display unit for automobiles according to the present invention.

A display unit 50 according to a first embodiment is connected to ECU 26. As shown in FIG. 2, the display unit 50 includes a graph type display means 52 comprising a vertical axis X and a horizontal axis Y. The vertical axis X is a remaining capacity display portion 54 for displaying the remaining capacity C of the batteries 12, and the horizontal axis Y is a remaining distance display portion 56 for displaying the remaining distance ZS in relation to the remaining capacity C of the batteries 12.

The remaining capacity display portion 54 and the remaining distance display portion 56 can be displayed by a digital type bar graph, having a color liquid crystal display element LCD (multiple color display means) 57 capable of multiple color presentation for displaying a change in relationship between the remaining capacity C and the remaining distance ZS by means of a change in area.

The remaining distance display portion 56 is configured to have a triangular shape with depths which become narrower in a direction from F (100%) to E (0%) of the vertical axis X, namely in a downward direction, and a line, extended upward from an intersection between its inclined line 58 and a horizontal line of the remaining capacity C, represents the remaining distance ZS. For example, in FIG. 2, the cross-hatched portion represents the present status of the batteries wherein the remaining capacity C is ¾ (75%), and the remaining distance ZS is 75 km (as shown by the vertical dashed line and cursor at the top). In this situation, the remaining capacity display portion 54 and the remaining distance display portion 56 are displayed by a blue or white color.

Figure 3:
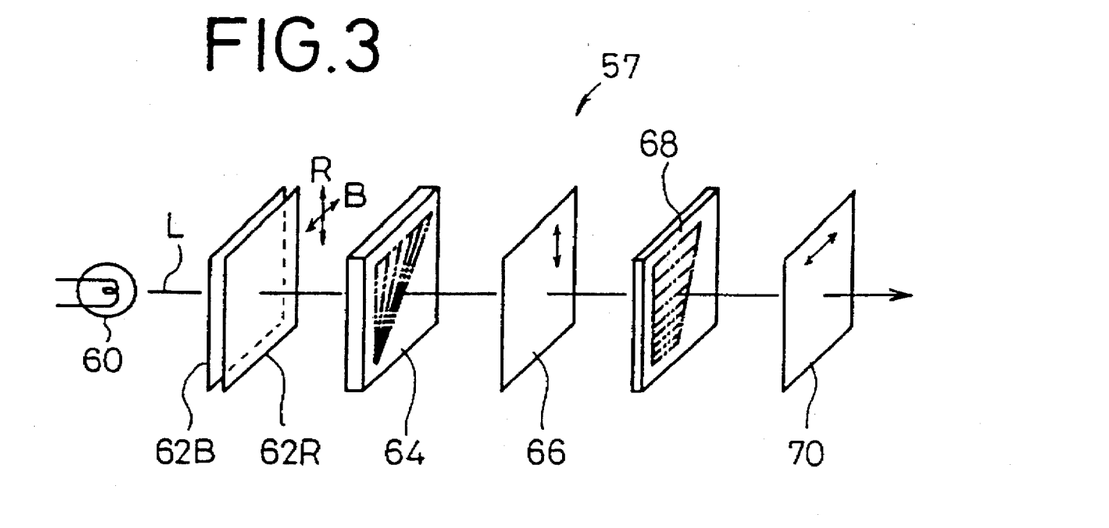
FIG. 3 is a schematic illustration of a color liquid crystal display element LCD for constituting the display unit shown in FIG. 2.

As shown in FIG. 3, the color liquid crystal display element LCD 57 includes a first color polarizing plate 62B for transmitting a blue light beam B, and a second color polarizing plate 62R for transmitting a red light beam R of a light beam L irradiated from a light source 60. A first TN (twisted nematic) cell 64, a first neutral polarizing plate 66, a second TN cell 68 and a second neutral polarizing plate 70 are successively arranged on an optical path in front of the first and second color polarizing plates 62B, 62R.

The first and second TN cells 64, 68 are arranged in a form to twist the direction of liquid crystal molecules by 90° when no voltage is applied, and to orientate the long axis of the liquid crystal molecules in the direction of an electric field when a voltage is applied. In FIG. 3, the first neutral polarizing plate 66 transmits a light beam polarized in the vertical direction only, and the second neutral polarizing plate 70 transmits a light beam polarized in the horizontal direction only.

Figure 4:
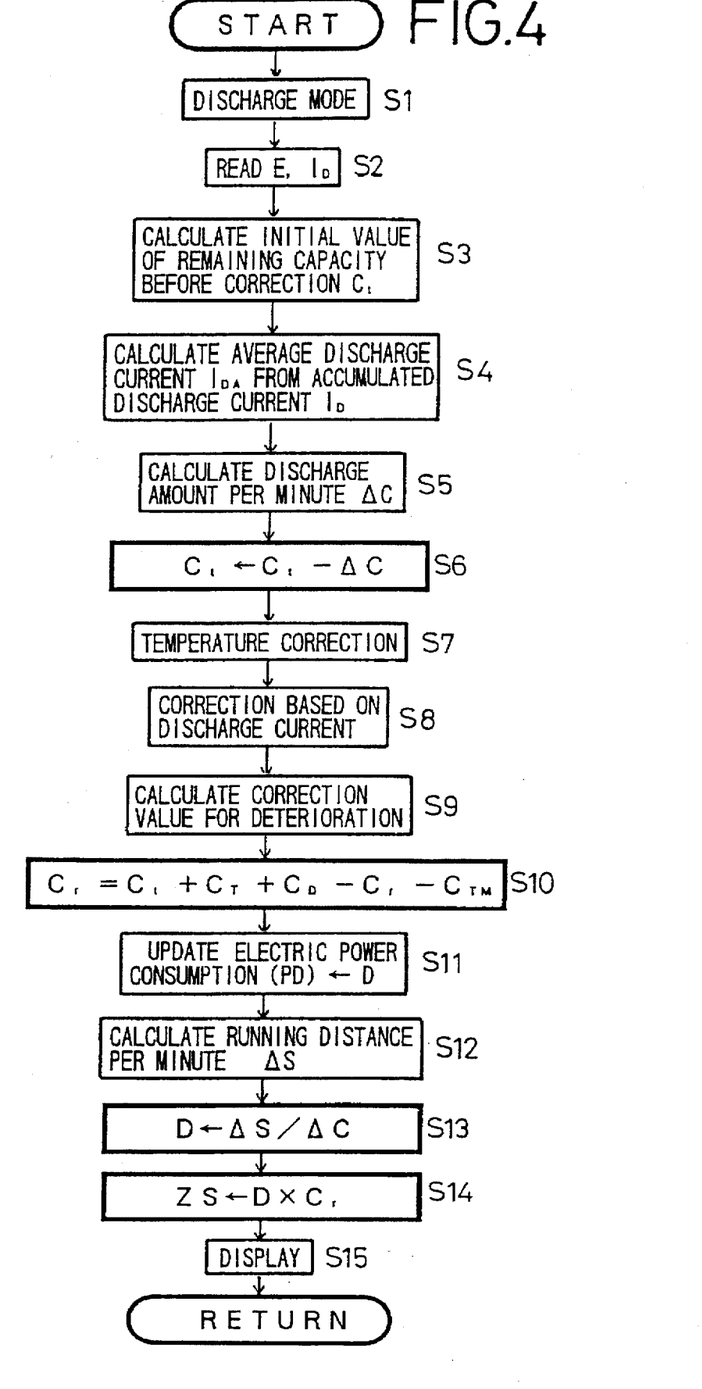
FIG. 4 is a flow chart for displaying a remaining amount of capacity of the batteries and a remaining distance on the display unit shown in FIG. 2.

In the construction as described above, a method will be described with reference to a flow chart in FIG. 4, in which the remaining capacity or energy after correction $C_r$ of the batteries 12 is calculated in a discharge mode in which currents are supplied from the batteries 12 to the motor $M_o$ and other electrical equipment such as an air conditioner, and the remaining distance ZS in relation to the remaining capacity after correction $C_r$ is calculated to display them.

Firstly, when an ignition key (not shown) inserted into the ignition switch 34 is rotated by a driver up to a start-up position of the motor $M_o$, ECU 26 determines that the discharge mode is given according to a signal outputted from the ignition switch 34 in step S1. The switching unit 30 is switched by a signal outputted from ECU 26 on the basis of this determination, and the batteries 12 are connected to PDU 32. A driving signal for the motor $M_o$ is outputted from ECU 26 to PDU 32. This driving signal allows a battery voltage E to be applied to the motor $M_o$ through the switching unit 30 and PDU 32, and the motor $M_o$ is rotated.

When the motor $M_o$ is rotated, ECU 26 reads the battery voltage E detected by the voltage detector 22 and the discharge current $I_D$ supplied from the batteries 12 to the motor $M_o$ and detected by the current detector 20 at a predetermined sampling time in a step S2. An initial value of the remaining capacity before correction $C_t$ of the batteries 12 in the discharge mode is read from a table stored in LUT 46 in a step S3 on the basis of the battery voltage E read in step S2.

Next, the discharge current $I_D$ read in the step S2 is accumulated, and an average discharge current $I_D$ per one minute of the accumulated discharge current $I_D$ is calculated in a step S4. Further, a discharge amount per one minute ΔC is calculated from the average discharge current $I_{DA}$ in a step S5, then the discharge amount per one minute ΔC is subtracted from the initial value of the remaining capacity before correction $C_t$, and the remaining capacity before correction $C_t$ is updated in a step S6. Thus, the remaining capacity before correction $C_t$ is updated for every one minute by ECU 26.

A battery temperature T detected by the temperature detector 24 is read by ECU 26. A corrected value of the remaining capacity before correction $C_t$ of the batteries 12 corrected for temperature (temperature-corrected capacity $C_T$) is read from a table stored in LUT 46 on the basis of the battery temperature T in a step S7. Further, a corrected value of the remaining capacity before correction $C_t$ of the batteries 12 corrected for the average discharge current $I_{DA}$ (current-corrected capacity $C_D$) is read from a table stored in LUT 46 in a step S8, on the basis of the average discharge current $I_{DA}$ per one minute calculated in the step S4.

Next, ECU 26 calculates a corrected value (deterioration-corrected capacity $C_R$) for a change in rated capacity due to deterioration of the batteries 12, and a corrected value (temporary corrected capacity $C_{TM}$) for an error of the remaining capacity C due to a cumulative error of the discharge amount ΔC generated during calculation of the remaining capacity C of the batteries 12 on the basis of a cumulative value of the discharge amount ΔC in a step S9. The temporary corrected capacity $C_{TM}$ is also generated when the remaining capacity before correction $C_t$ is calculated by accumulating the charge current $I_c$ in a charge mode.

The temperature-corrected capacity $C_T$, the current-corrected capacity $C_D$, the deterioration-corrected capacity $C_R$ and the temporary corrected capacity $C_{TM}$ thus obtained are used through ECU 26 to correct the remaining capacity before correction $C_t$ and calculate the remaining capacity after correction $C_r$ in a step S10.

In a step S11, after updating a previous electric power consumption PD to a present electric power consumption D, a running distance per one minute ΔS is calculated on the basis of a vehicle speed pulse inputted from the vehicle speed pulse detecting sensor 38 in a step S12. Next, the electric power consumption D is calculated by dividing the running distance per one minute ΔS by the discharge amount per one minute ΔC in a step S13, and the remaining distance ZS is calculated by multiplying the electric power consumption D by the remaining capacity after correction $C_r$ in a step S14. The remaining capacity C which is the remaining capacity after correction $C_r$ and the remaining distance ZS are displayed on the display means 52 in step S15. The remaining distance display portion 56 shown in FIG. 2 is usually constituted by a blue portion 56B and a dark portion 56K as described below.

In the first embodiment, as shown in FIG. 2, the display unit 50 has the graph type display means 52 constituted by the vertical axis X and the horizontal axis Y. The vertical axis X is the remaining capacity display portion 54 for displaying the remaining capacity C (which is actually the remaining capacity after correction $C_r$) of the batteries 12, and the horizonal axis Y is the remaining distance display portion 56 for displaying the remaining distance ZS in relation to the remaining capacity C of the batteries 12. It is easily confirmed in FIG. 2 that the remaining energy C is ¾ and the remaining distance ZS is 75 km.

Therefore, a relationship between the remaining capacity C and the remaining distance ZS is displayed in one graph in an analog manner. Thus, a beneficial effect is obtained in that a driver can easily recognize the relationship between the remaining capacity C and the remaining distance ZS at a glance only by looking at the single graph (display means 52).

Further, in the first embodiment, the relationship between the remaining capacity C and the remaining distance ZS is updated every one minute. Thus, if the present running state is deteriorating compared with a standard running state along the inclined line 58 in FIG. 2 due to, for example, racing the motor in a stopped state or the like, the remaining distance ZS decreases. For this reason, as shown in FIG. 5, the remaining distance display portion 56 is sectioned by colors, and a reference line 80 is provided inclining with respect to the vertical direction.

Figure 6:
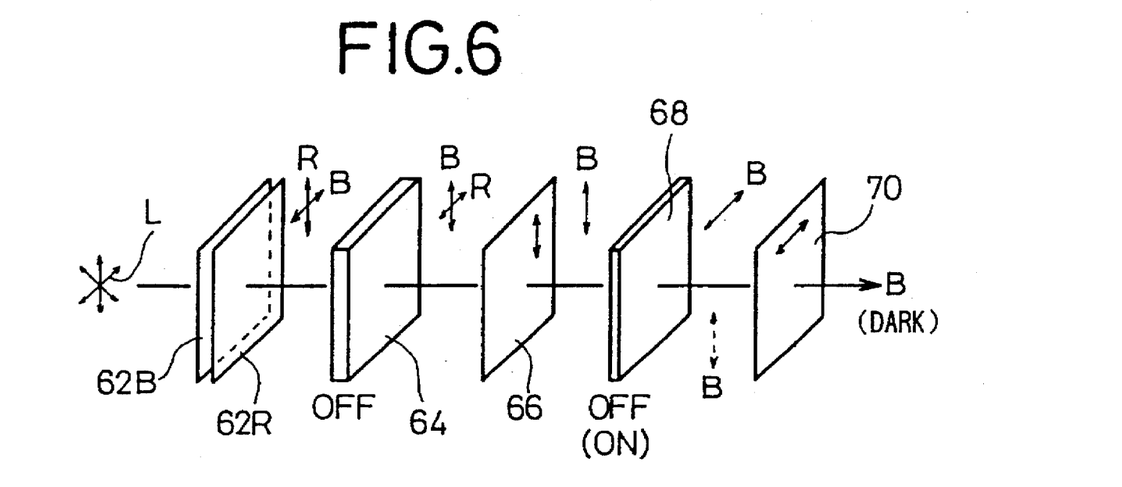
FIG. 6 is a view for explaining a display with a blue light beam by using the color liquid crystal display element LCD shown in FIG. 3.

Namely, as shown in FIG. 6, a blue light beam B and a red light beam R, obtained by transmitting a light beam L irradiated from the light source 60 through the first and second color polarizing plates 62B, 62R, arrive at the first neutral polarizing plate 66 after rotating their polarization directions by 90° by means of the first TN cell 64 to which no voltage is applied. The first neutral polarizing plate 66 transmits the blue light beam B only. The blue light beam B is transmitted through the second neutral polarizing plate 70 after rotating its polarization direction by 90° by means of the second TN cell 68 to which no voltage is applied. Thus, a blue portion (or white portion) 56B is formed on the remaining distance display portion 56. When a voltage is applied to the second TN cell 68, the blue light beam B is transmitted through the second TN cell 68 with its polarization direction maintained exactly, and it is interrupted by the second neutral polarizing plate 70 to form a dark portion 56K.

Figure 7:
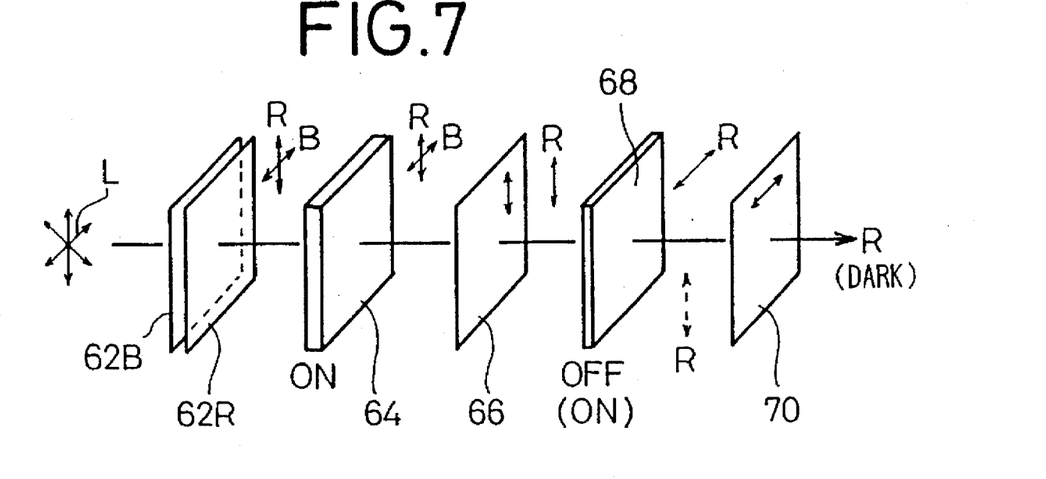
FIG. 7 is a view for explaining a display with a red light beam by using the color liquid crystal display element LCD shown in FIG. 3.

As shown in FIG. 7, when a voltage is applied to the first TN cell 64, the red light beam R is only transmitted by the first neutral polarizing plate 66. The red light beam R is transmitted through the second neutral polarizing plate 70 to form a red portion 56R when no voltage is applied to the second TN cell 68, while it is interrupted by the second neutral polarizing plate 70 to form a dark portion 56K when a voltage is applied to the second TN cell 68.

Figure 5:
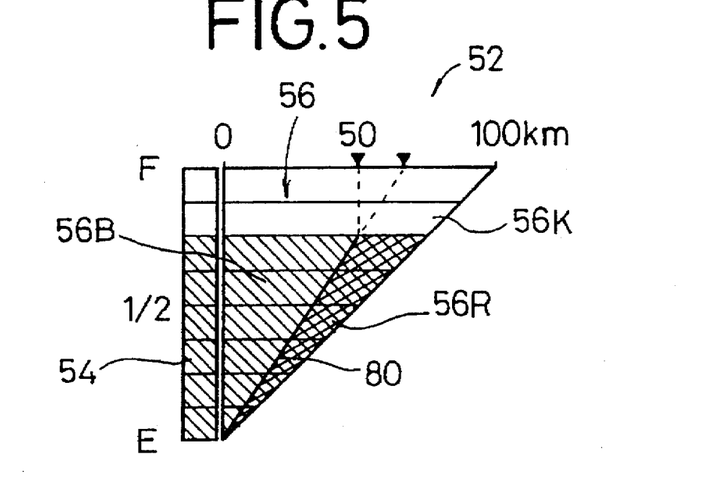
FIG. 5 is a view for explaining the operation of the display unit shown in FIG. 2.

Thus, the reference line 80 in FIG. 5 is formed at a boundary between the blue portion 56B and the red portion 56R, and the relationship between the remaining capacity C and the remaining distance ZS is displayed as a change in area. Therefore, as an example, the remaining distance ZS is estimated at 50 km when the remaining capacity C is ¾, in which it is possible to continue running for another 75 km provided that a standard running state is used. However, it is confirmed that if the present running state is continued, it is only possible to continue running for another 50 km.

The remaining distance display portion 56 has been sectioned by colors into the blue portion 56B and the red portion 56R in the explanation described above. However, it is also possible to successively change colors, for example, blue→green→red in relation to a running state. This provides an advantage in that the driver's attention can be attracted as conditions change.

Figure 8:
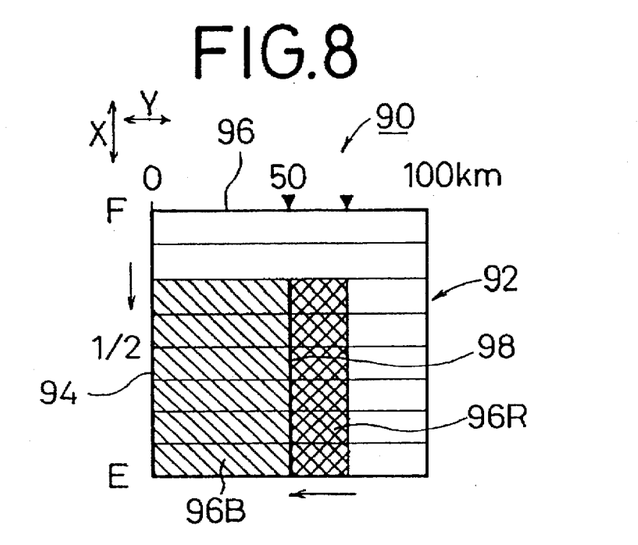
FIG. 8 is an explanatory view of a display unit in accordance with a second embodiment of the display unit for automobiles according to the present invention.

A display unit 90 according to a second embodiment will be explained with reference to FIG. 8. This display unit 90 includes a graph type display means 92 comprising a vertical axis X and a horizontal axis Y. The vertical axis X is a remaining capacity display portion 94 for displaying the remaining capacity C of batteries 12, and the horizontal axis Y is a remaining distance display portion 96 for displaying a remaining distance ZS in relation to the remaining capacity C of the batteries 12. They are constituted in the same manner as those of the remaining capacity display portion 54 and the remaining distance display portion 56 described above.

The display means 92 has a rectangular shape. When a running state is continued, the remaining capacity C shifts in a downward direction (toward the E), and the remaining distance ZS shifts in a left direction (toward the 0 km) (see arrows in FIG. 8). The display means 92 has a blue (or white) color in a standard running state. When a running state deteriorates from the standard running state, in the same manner as in FIG. 5, the remaining distance ZS decreases, the display means 92 is sectioned into a blue portion 96B and a red portion 96R, and a reference line 98 is formed at a boundary therebetween. Thus, the display unit 90 provides the same advantages as that of the display unit 50 described above.

The first and second embodiments have been explained by using the display units 50, 90 for displaying the remaining capacity C of the batteries 12 of the electric automobile and the remaining distance ZS in relation to the remaining capacity C. However, with respect to an engine automobile driven by an internal combustion engine, there may be similarly provided a display unit for displaying a remaining amount of energy, such as gasoline, and a remaining distance in relation to the remaining amount.

What is claimed is:

1. A display unit for an automobile for displaying a remaining amount of driving energy and a remaining distance, including:

a cartesian graph display means comprising a vertical axis disposed substantially along a vertical side of a display area and a horizontal axis disposed substantially along a horizontal side of said display area, such that an origin of said graph lies substantially in a corner of said display area; wherein said vertical axis indicates the remaining amount of driving energy; and said horizontal axis indicates the remaining distance, said remaining distance corresponding to that which can be travelled by the automobile on said remaining amount of driving energy.

2. A display unit according to claim 1, wherein said display means includes a multiple-color display means providing respective colored display areas for displaying a change in relationship between the remaining amount of driving energy and the remaining distance, said change in relationship being indicated by a change in size of said colored display areas.

3. A display unit according to claim 1 or 2, wherein said display means displays a change in the remaining distance in accordance with an alternate running state which is different from a current running state under an identical remaining amount of driving energy, together with a display of the remaining distance in said current running state.

4. A display unit according to claim 3, wherein said displays of the remaining distance in said current running state and in said alternate running state different from said current running state are both triangular with said displays being adjacent and forming a boundary between the two triangular displays.

5. A display unit for an automobile for displaying both a remaining amount of driving energy and a remaining distance, including:

a cartesian graph display means comprising a first axis disposed substantially along one side of a display area and a second axis disposed substantially along another side of said display area, said first and second axes being positioned at a substantial angle such that an origin of said graph lies substantially in a corner of said display area; wherein said first axis indicates the remaining amount of driving energy; and said second axis indicates the remaining distance, said remaining distance corresponding to that which can be travelled by the automobile on said remaining amount of driving energy.

6. A display unit according to claim 3, wherein said alternate running state is different than said current running state in the amount of driving energy used for travelling a given distance.

7. A display unit according to claim 4, wherein said alternate running state is different than said current running state in the amount of driving energy used for travelling a given distance.

8. A display unit according to claim 1 or 5, wherein said origin of said graph represents a zero said remaining amount of driving energy and a zero said remaining distance.

* * * * *